United States Patent
Feng et al.

(10) Patent No.: US 10,785,375 B2
(45) Date of Patent: Sep. 22, 2020

(54) METHOD AND APPARATUS FOR SENDING AND RECEIVING VOICE OF BROWSER, AND VOICE INTERCOM SYSTEM

(71) Applicant: Hangzhou Hikvision Digital Technology Co., Ltd., Hangzhou, Zhejiang (CN)

(72) Inventors: Zhongjian Feng, Zhejiang (CN); Xiangzhen Chen, Zhejiang (CN); Xiangqing Jin, Zhejiang (CN)

(73) Assignee: Hangzhou Hikvision Digital Technology Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 16/318,621

(22) PCT Filed: Jun. 21, 2017

(86) PCT No.: PCT/CN2017/089394
§ 371 (c)(1),
(2) Date: Jan. 17, 2019

(87) PCT Pub. No.: WO2018/014696
PCT Pub. Date: Jan. 25, 2018

(65) Prior Publication Data
US 2019/0174008 A1    Jun. 6, 2019

(30) Foreign Application Priority Data
Jul. 18, 2016   (CN) .......................... 2016 1 0569192

(51) Int. Cl.
*H04M 9/00*     (2006.01)
*H04M 11/04*    (2006.01)
(Continued)

(52) U.S. Cl.
CPC .......... *H04M 11/045* (2013.01); *G06F 3/162* (2013.01); *G06F 16/00* (2019.01); *G10L 19/167* (2013.01); *H04M 2207/40* (2013.01)

(58) Field of Classification Search
None
See application file for complete search history.

(56) References Cited

U.S. PATENT DOCUMENTS

| 9,037,735 B1 | 5/2015 | Fallows et al. |
| 2001/0038624 A1* | 11/2001 | Greenberg .......... H04L 29/1216 370/352 |

(Continued)

FOREIGN PATENT DOCUMENTS

| CN | 102752431 A | 10/2012 |
| CN | 102843398 A | 12/2012 |

(Continued)

OTHER PUBLICATIONS

Shi, Research on Key Technologies of Html5 WebSocket Protocol and Implementation of Real-Time Web Communication System Base on WebSocket Protocol, Thesis Submitted to Nanjing University of Posts and Telecommunications for the Degree of Master of Engineering, Apr. 2014, p. 1-68.

(Continued)

*Primary Examiner* — Quoc D Tran
(74) *Attorney, Agent, or Firm* — Bret E. Field; Bozicevic, Field & Francis LLP

(57) ABSTRACT

A method and apparatus for voice transmission and reception by a browser and a voice intercom system are provided. The method for voice transmission by a browser includes: collecting first voice data through a built-in audio collection interface of the browser (S101); obtaining a first voice sampling parameter that can be utilized by a target device (S102) to process voice data; sampling the first voice data based on the first voice sampling parameter to obtain target (Continued)

voice data (S103); and transmitting the target voice data to the target device (S104). The method enables a browser to have a function of voice intercom without using a plug-in.

12 Claims, 3 Drawing Sheets

(51) Int. Cl.
*G06F 16/00* (2019.01)
*G06F 3/16* (2006.01)
*G10L 19/16* (2013.01)

(56) References Cited

U.S. PATENT DOCUMENTS

| | | |
|---|---|---|
| 2012/0170767 A1 | 7/2012 | Astrom et al. |
| 2015/0172349 A1* | 6/2015 | Gonzalez De Langarica ............... H04L 65/1016 709/219 |
| 2016/0028790 A1 | 1/2016 | Eriksson et al. |
| 2017/0078359 A1* | 3/2017 | Herrero ............... H04L 63/0428 |
| 2018/0159901 A1* | 6/2018 | Chatras ............... H04L 65/1016 |
| 2019/0312842 A1* | 10/2019 | Klaghofer ............. H04L 63/029 |

FOREIGN PATENT DOCUMENTS

| | | |
|---|---|---|
| CN | 103414835 A | 11/2013 |
| CN | 103685269 A | 3/2014 |
| CN | 105407123 A | 3/2016 |
| CN | 105516112 A | 4/2016 |
| WO | WO2016107347 A1 | 7/2016 |

OTHER PUBLICATIONS

Unixzii, Use HTML5 API (AudioContext) to Achieve Visualized Spectrum Effect, Published May 1, 2015; Retrieved Sep. 25, 2019; URL: https://blog.csdn.net/unixzii/article/details/45422899.

* cited by examiner

METHOD AND APPARATUS FOR SENDING AND RECEIVING VOICE OF BROWSER, AND VOICE INTERCOM SYSTEM

The present application claims the priority to a Chinese Patent Application No. 201610569192.7, filed with the China National Intellectual Property Administration on Jul. 18, 2016 and entitled "method and apparatus for sending and receiving voice of browser, and voice intercom system", which is incorporated into the present application by reference in its entirety.

TECHNICAL FIELD

The present application relates to the field of web front-end technology, and in particular, to a method and apparatuses for voice transmission and reception by a browser and a voice intercom system.

BACKGROUND

At present, in a security system, voice intercom between a browser and a server of the security system is typically implemented through a browser plug-in. When a user requires voice intercom, it is needed to input voice to a browser in a terminal such that the browser can collect voice data to be transmitted. However, in relevant art, a plug-in is required for a browser to collect voice signals and establish a long connection with the server of the security system, so as to ensure a real-time voice intercom and transmit the collected voice signals to the server of the security system. The browser also receives, through a plug-in, voice data transmitted by the server of the security system. As such, plug-ins of a browser play an important role in the implementation of voice intercom. The server of the security system and the browser both serve as intercom devices.

However, installation of a plug-in in a browser may enhance a user's privilege. For example, the user may be able to modify the plug-in and use the modified plug-in to download information of other users without being discovered. This may be a potential danger to the security of user information. Therefore, plug-ins are very likely to be disabled in a future developed browser. As a result, it is impossible for a browser without plug-ins to carry out voice communication with the server of the security system.

Therefore, there is an urgent need to provide a new solution for voice intercom to enable a browser to implement voice transmission without using a plug-in.

SUMMARY

Embodiments of the present application provide a method and apparatuses for voice transmission and reception by a browser and a voice intercom system to enable a browser to implement voice transmission without using a plug-in. Specifically, the following technical solutions are provided.

In a first aspect, an embodiment of the present application provides a method for voice transmission by a browser. The method may include:

collecting first voice data through a built-in audio collection interface of the browser;

obtaining a first voice sampling parameter that can be utilized by a target device to process voice data;

sampling the first voice data based on the first voice sampling parameter to obtain target voice data; and transmitting the target voice data to the target device.

Optionally, the first voice sampling parameter comprises a first voice sampling accuracy and a first voice sampling frequency.

Optionally, sampling the first voice data based on the first voice sampling parameter to obtain target voice data comprises:

calculating a ratio between the first voice sampling frequency and a second voice sampling frequency; wherein, the second voice sampling frequency is a voice sampling parameter that can be utilized by the built-in audio collection interface of the browser to process voice data; and sampling the first voice data based on the ratio and the first voice sampling accuracy to obtain the target voice data.

Optionally, before transmitting the target voice data to the target device, the method further comprises:

establishing a communication channel to the target device through Websocket; and transmitting the target voice data to the target device comprises: transmitting the target voice data to the target device through the communication channel.

Optionally, obtaining a first voice sampling parameter that can be utilized by a target device to process data comprises: receiving, through the communication channel, the first voice sampling parameter transmitted by the target device.

In a second aspect, an embodiment of the present application provides a method for voice reception by a browser. The method may include:

receiving second voice data transmitted by a target device;

obtaining a first voice sampling parameter that can be utilized by a target device to process data;

encapsulating the second voice data based on the first voice sampling parameter to obtain encapsulated voice data;

decoding, through a built-in audio decoding interface of the browser, the encapsulated voice data as obtained; and playing the decoded second voice data.

Optionally, the first voice sampling parameter includes a first voice sampling accuracy and a first voice sampling frequency.

Optionally, before receiving second voice data transmitted by a target device, the method further comprises:

establishing a communication channel to the target device through Websocket; and receiving second voice data transmitted by a target device comprises: receiving, through the communication channel, the second voice data transmitted by the target device.

Optionally, obtaining a first voice sampling parameter that can be utilized by a target device to process voice data comprises: receiving, through the communication channel, the first voice sampling parameter transmitted by the target device.

In the third aspect, an embodiment of the present application provides an apparatus for voice transmission by a browser. The apparatus may include a collector, a first obtaining unit, a sampler and a transmitter.

The collector is configured to collect first voice data through a built-in audio collection interface of the browser.

The first obtaining unit is configured to obtain a first voice sampling parameter that can be utilized by a target device to process voice data.

The sampler is configured to sample the first voice data based on the first voice sampling parameter to obtain target voice data.

The transmitter is configured to transmit the target voice data to the target device.

Optionally, the first voice sampling parameter obtained by the first obtaining unit comprises a first voice sampling accuracy and a first voice sampling frequency.

Optionally, the sampler may include a calculating sub-unit and a sampling sub-unit.

The calculating sub-unit is configured to calculate a ratio between the first voice sampling frequency and a second voice sampling frequency; wherein, the second voice sampling frequency is a voice sampling parameter that can be utilized by the built-in audio collection interface of the browser to process voice data.

The sampling sub-unit is configured to sample the first voice data based on the ratio and the first voice sampling accuracy to obtain the target voice data.

Optionally, the apparatus may further include a first communication connection unit.

The first communication connection unit is configured to, before sending the target voice data to the target device, establish a communication channel to the target device through Websocket.

The transmitter is configured to transmit the target voice data to the target device through the communication channel established by the first communication connection unit.

Optionally, the first obtaining unit is configured to receive, through the communication channel established by the first communication connection unit, the first voice sampling parameter transmitted by the target device.

In the fourth aspect, an embodiment of the present application provides an apparatus for voice reception by a browser. The method may include a receiver, a second obtaining unit, an encapsulation unit, a decoder and a player.

The receiver is configured to receive second voice data transmitted by a target device.

The second obtaining unit is configured to obtain a first voice sampling parameter that can be utilized by a target device to process voice data.

The encapsulation unit is configured to encapsulate the second voice data based on the first voice sampling parameter to obtain encapsulated voice data.

The decoder is configured to decode, through a built-in audio decoding interface of the browser, the encapsulated voice data as obtained.

The player is configured to play the decoded second voice data.

Optionally, the first voice sampling parameter obtained by the second obtaining unit comprises a first voice sampling accuracy and a first voice sampling frequency.

Optionally, the apparatus may further include a second communication connection unit.

The second communication connection unit is configured to, before receiving second voice data sent by a target device, establish a communication channel to the target device through Websocket.

The receiver is configured to receive, through the communication channel established by the second communication connection unit, the second voice data transmitted by the target device.

Optionally, the second obtaining unit is configured to receive, through the communication channel established by the second communication connection unit, the first voice sampling parameter sent by the target device.

In the fifth aspect, an embodiment of the present application provides a voice intercom system. The system may include an apparatus for voice transmission by a browser and a target device.

The apparatus for voice transmission by a browser is configured to collect first voice data through a built-in audio collection interface of the browser; obtaining a first voice sampling parameter that can be utilized by a target device to process voice data; sample the first voice data based on the first voice sampling parameter to obtain target voice data; and transmit the target voice data to the target device.

The target device is configured to receive the target voice data transmitted by the apparatus for voice transmission by a browser.

In the sixth aspect, an embodiment of the present application provides another voice intercom system. The system may include an apparatus for voice reception by a browser and a target device.

The target device is configured to transmit second voice data to the apparatus for voice reception by a browser.

The apparatus for voice reception by a browser is configured to receive second voice data transmitted by a target device; obtain a first voice sampling parameter that can be utilized by a target device to process voice data; encapsulate the second voice data based on the first voice sampling parameter to obtain encapsulated voice data; decode, through a built-in audio decoding interface of the browser, the encapsulated voice data as obtained; and play the decoded second voice data.

In a seventh aspect, an embodiment of the present application provides a storage medium for storing an executable program code which, when executed, performs the method for voice transmission by a browser or the method for voice reception by a browser as provided by the above embodiments.

In an eighth aspect, an embodiment of the present application further provides an application program; which performs, when being executed, the method for voice transmission by a browser or the method for voice reception by a browser in the embodiments of the present application as described above.

In a ninth aspect, an embodiment of the present application further provides an electronic device. The electronic device includes: a memory and a processor; wherein, the memory is configured to store a computer program;

the processor is configured to execute the program stored in the memory, so as to perform the method for voice transmission by a browser or the method for voice reception by a browser as described in embodiments of the present application.

In embodiments of the present application, first voice data is collected through a built-in audio collection interface, instead of a plug-in, of a browser. Before transmission of voice data to a connected target device, the first voice data is sampled with a first voice data sampling parameter obtained from the target device, Target voice data is hereby obtained. The target device can play the target voice data as transmitted thereto. As such, the browser is able to collect and transmit voice data without using a plug-in. Of course, all the advantages as described above may not be achieved by each of the products or methods of the present application.

BRIEF DESCRIPTION OF THE DRAWINGS

To describe the solutions of embodiments of the invention or the prior art more clearly, the accompanying drawings to be used in the description of embodiments or the prior art will are described briefly below. Obviously, the accompanying drawings described below are merely drawings of some embodiments of the invention. Those skilled in the art may obtain other drawings based on these accompanying drawings without creative efforts.

DETAILED DESCRIPTION

Technical solutions in the embodiments of the present application are clearly and completely described below with reference to the accompanying drawings in the embodiments of the present application. Obviously, the described embodiments are merely a part of but not all the embodiments of the present application. All other embodiments obtained without creative efforts in view of the embodiments of the present application by those skilled in the art fall within the scope of the present application.

To solve the problems in relevant art, embodiments of the present application provide respectively, from perspectives of reception and transmission of voice data by a browser, a method and apparatus for voice transmission by a browser, a method and apparatus for voice reception by a browser, and a voice intercom system.

An introduction to the method for voice transmission by a browser according to an embodiment of the present application is first provided below, from the perspective of voice transmission from a browser (i.e., passive voice reception by a target device).

It should be noted that the method for voice transmission by a browser is applied on a browser. The browser serves as a counterpart of a target device in a voice intercom system. A communication is established between the browser and the target device. A communication request may be transmitted from the browser to the target device or in a contrary direction. Communication between the browser and the target device is allowed once a communication connection is established. Real-time transmission of voice by the browser is ensured.

It is understood that, the browser may be disposed on an any terminal. The terminal may be: a smart TV, a notebook computer, a tablet computer, a smart phone and the like. The browser may be a web browser, or a browser client software running in a terminal. These are all possible. It is also possible that the target device is a server.

Figure 1:
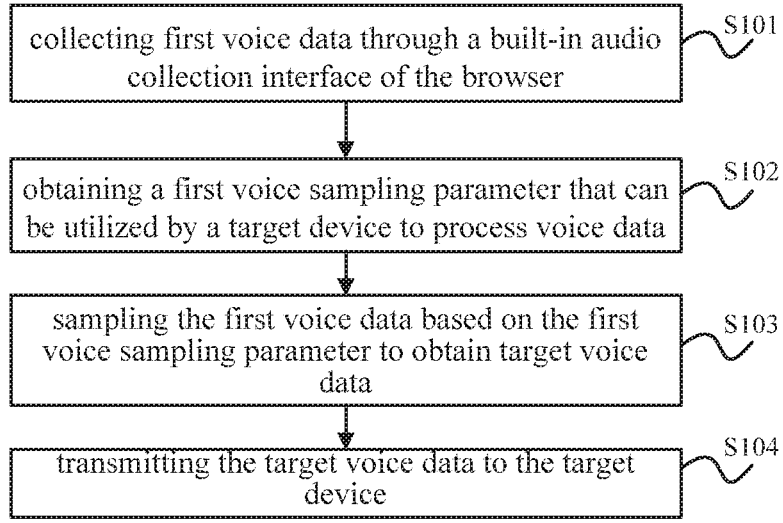
FIG. 1 is a flow chart of a method for voice transmission by a browser according to an embodiment of the present application.

As shown in FIG. 1, the embodiment of the present application provides a method for voice transmission by a browser, from a perspective of transmission of voice data by the browser. The method may include the following operations.

At S101, first voice data is collected through a built-in audio collection interface of the browser.

Upon the reception of a voice transmission instruction, the browser collects the first voice data through a built-in audio collection interface (for example, a getUserMedia interface). As such, a security risk related to collection of voice data through a plug-in is avoided and the security for user information is improved.

The audio collection interface getUserMedia is a built-in interface of the browser. The browser may collect, through the interface, voice data input by the user. Further, the browser may collect the voice data with a sampling accuracy and a sampling frequency of the built-in interface.

At S102, a first voice sampling parameter that can be utilized by a target device to process voice data is obtained.

The first voice data collected by the browser may need to be further sampled so as to be identified or played by the target device. Thus, voice sampling parameter that can be utilized by the target device to process voice data is obtained from the target device. The first voice sampling parameter is a voice sampling parameter that can be utilized by the target device to process voice data.

It is noted that the first voice sampling parameter may be obtained from the target device each time the method for voice transmission by a browser is performed. The first voice sampling parameter may also be obtained from the target device when the method for voice transmission by a browser is performed for the first time and then locally stored, such that the first voice sampling parameter can be directly obtained locally when the method for voice transmission by a browser is subsequently performed.

In one implementation, obtaining, when the method for voice transmission by a browser is implemented each time or for the first time, the first voice sampling parameter from the target device may include: transmitting the first voice sampling parameter during a three-way handshake process of establishing a connection between the browser and the target device; or acquiring, actively or passively, the first voice sampling parameter from the target device when a communication channel between the browser and the target device is being established; or otherwise, acquiring, actively or passively, the first voice sampling parameter from the target device before the operation of S101 is performed. In other words, the sequence in which operations S101 and S102 are performed is not limited in the embodiment.

It can be understood that a constant first voice sampling parameter of the target device may be stored locally, after collection thereof from the target device, for subsequent use. However, a first voice sampling parameter of the target device that typically varies may be collected from the target device each time the method for voice transmission by a browser is implemented.

At S103, the first voice data is sampled based on the first voice sampling parameter to obtain target voice data.

The first voice sampling parameter, as pre-stored locally or obtained from the target device, may be used to sample the first voice data so as to obtain target voice data that can be identified and played by the target device.

At S104, the target voice data is transmitted to the target device.

After being obtained by sampling, the target voice data may be transmitted to the target device by the browser. As such, voice transmission free of plug-ins is achieved.

It is noted that, the embodiment is not limited to voice transmission from browser to target device, simultaneous bidirectional voice transmission is also possible.

In the embodiment of the present application, first voice data is collected through a built-in audio collection interface of the browser. As such, there is no need to collect the first voice data through a plug-in of the browser. The first voice data is, before being transmitted to the target device, sampled with a first voice data sampling parameter obtained from the target device. Target voice data is thus obtained. The target voice data transmitted to the target device can be played thereon. As such, the browser is able to collect and transmit voice data without using a plug-in.

In one implementation of the present application, first voice sampling parameters include a first voice sampling accuracy and a first voice sampling frequency.

It can be understood that the first voice sampling parameters include, but are not limited to, the first voice sampling accuracy and the first voice sampling frequency. The first voice sampling frequency is related to a frequency at which the voice data is sampled, and the first voice sampling accuracy is related to accuracy of sampled voice data.

In one implementation of the present application, sampling the first voice data based on the first voice sampling parameter to obtain target voice data includes:

calculating a ratio between the first voice sampling frequency and a second voice sampling frequency; wherein, the second voice sampling frequency is a voice sampling parameter that can be used by a built-in audio collection interface of the browser to process voice data; and sampling the first voice data based on the ratio and the first voice sampling accuracy to obtain the target voice data.

It can be understood that, the first voice sampling frequency is a voice sampling parameter that can be utilized by the target device to process voice data, and the second voice sampling frequency is a voice sampling parameter for voice data that can be utilized by a built-in audio collection interface of the browser to process voice data. For example, the built-in audio collection interface of the browser, getUserMedia, has a sampling frequency of 48 kHz and a sampling accuracy of 32 bits. However, the sampling frequency of the target device is not 48 kHz and the sampling accuracy of the target device is not 32 bits. In this case, a sampling on the voice data collected by the built-in audio collection interface (getUserMedia) is required, to obtain post-sampling voice data that conforms to the sampling frequency and sampling accuracy of the target device.

To ensure that the first voice data collected by the browser can be identified and played by the target device, the first voice data may be re-sampled based on a calculated ratio between the first voice sampling frequency and the second voice sampling frequency. Assuming that the first voice sampling frequency is 24 kHz and the second voice sampling frequency is 48 kHz (i.e., the ratio between the first voice sampling frequency and the second voice sampling frequency is ½), the first voice data may then be re-sampled based on the ratio. In this case, the sampling frequency for the first voice data is doubled. In addition, the sampled first voice data is further processed according to the first voice sampling accuracy so as to obtain target voice data that can be identified and played by the target device.

In one implementation of the present application, the target voice data and the first voice data are of a pulse code modulated (PCM) format.

It can be understood that the built-in audio collection interface of browser acquires, in a format of PCM, voice signals to obtain the first voice data. That is, the built-in audio collection interface of browser samples the voice signal at regular intervals and then discretizes the sampled signal. The sampled value is then rounded off based on hierarchical units. Further, the sampled value is denoted by a set of binary codes that indicate an amplitude of the sampled pulse. As such, binary code-based first voice data is obtained. In addition, as the target voice signal transmitted by the browser to the target device is also binary code-based voice data of the lowest level, there is no need to use a plug-in to facilitate the transmission of the target voice signal.

In one implementation of the present application, before the transmission of the target voice data to the target device, the method may further include:

establishing a communication channel to the target device through Websocket.

The transmission of the target voice data to the target device includes transmission of the target voice data to the target device through the communication channel.

It can be understood that, in this implementation, a communication connection between the browser and the target device is established through Websocket and a long connection between the browser and the target device is implemented, such that a normal communication between the browser and the target device is allowed. In other words, the browser may transmit the target voice data to the target device through the communication channel to implement the transmission of voice.

The browser may send a Websocket communication request to the target device, and receive a Websocket communication request sent by the target device. After the establishment of a Websocket communication connection, a long connection between the browser and the target device may be implemented. A Websocket communication request has a small header, and thus occupies less bandwidth resources. Websocket is a new protocol of HTML5 that can enable full-duplex communication between a browser and a target device. As such, a real-time transmission of voice data by a browser is ensured.

In one implementation of the present application, obtaining a first voice sampling parameter that can be utilized by a target device to process voice data includes: receiving the first voice sampling parameter transmitted by the target device through the communication channel.

It can be understood that, in this implementation, after the establishment of a Websocket communication channel between the browser and the target device, the browser may receive the first voice sampling parameter transmitted by the target device through the communication channel, so as to acquire the first voice sampling parameter.

In one implementation of the present application, after the transmission of the target voice data to the target device, the method may further include:

receiving, through the established Websocket communication channel, response voice data transmitted by the target device as a reply to the target voice data;

obtaining a first voice sampling parameter that can be utilized by a target device to process voice data;

encapsulating the response voice data based on the first voice sampling parameter to obtain encapsulated response voice data;

decoding, through a built-in audio decoding interface of the browser, the encapsulated response voice data as obtained; and playing the decoded response voice data.

It can be understood that, upon reception of the target voice data transmitted by the browser through the established Websocket communication channel, the target device answers the browser with response voice data. Upon reception of the response voice data transmitted by the target device, the browser encapsulates the received response voice data based on the obtained first voice sampling parameter that can be utilized by the target device to process voice data, so as to obtain the encapsulated response voice data. The browser then decodes the encapsulated voice data through a built-in audio decoding interface (for example, decodeAudioData), and plays the decoded response voice data through a built-in audio playing interface (for example, AudioContext).

It should be emphasized that the format in which the response voice data is encapsulated includes, but is not limited to, Java.

In one implementation of the present application, the response voice data is of pulse code modulated (PCM) format.

It can be understood that, in reply to PCM-formatted voice data, the target device answers the browser with binary code-based response voice data of the lowest-level. A plug-in is not required for the browser or the terminal on which the browser runs to receive the response voice data.

Further, an introduction to the method for voice reception by a browser according to an embodiment of the present application provided below, from the perspective of voice reception by a browser (i.e., voice transmission by a target device).

It should be noted that, the method for voice reception by a browser is applied to a browser. The browser serves, in a voice intercom system, as a counterpart of a target device. A communication connection is established between the browser and the target device. A communication request may be transmitted from the browser to the target device or in a contrary direction. Communication between the browser and the target device is allowed once a communication connection is established. Real-time voice transmission by the browser can be ensured.

It is understood that, the browser may be disposed on an any terminal. The terminal may be: a smart TV, a notebook computer, a tablet computer, a smart phone and the like. The browser may be a web browser, or a browser client software running in a terminal. These are all possible. It is also possible that the target device is a server.

Figure 2:
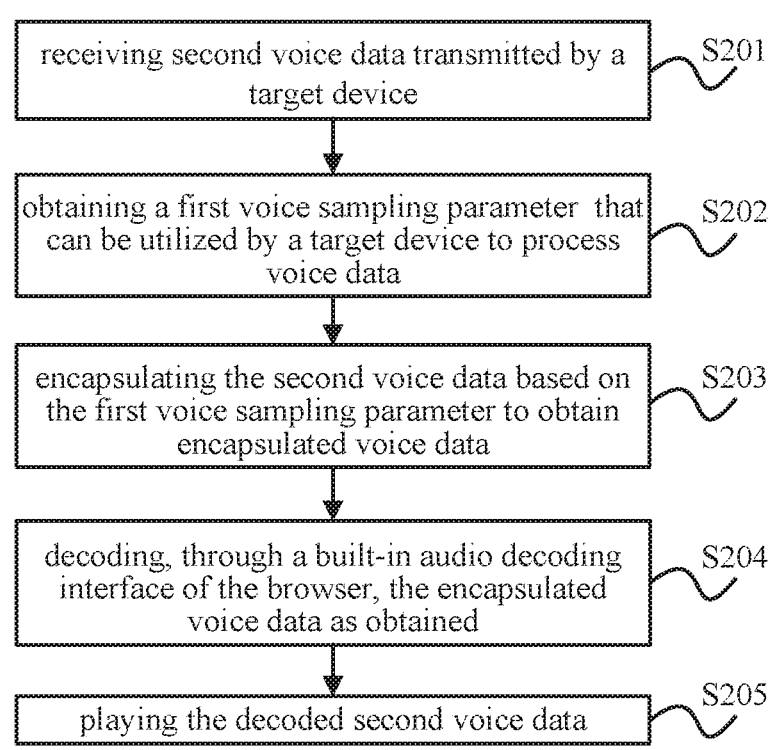
FIG. 2 is a flow chart of a method for voice reception by a browser according to an embodiment of the present application.

As shown in FIG. 2, the embodiment of the present application provides a method for voice reception by a browser, from the perspective of voice data reception by the browser. The method may include the following operations.

At S201, second voice data transmitted by a target device is received.

Upon reception of a voice receiving instruction, the browser may receive, through a built-in audio collection interface (for example, a getUserMedia interface), the second voice data transmitted by the target device. As such, a security risk related to reception of voice data through a plug-in is avoided and the security for user information is improved.

In addition, the target device may also actively transmit the second voice data to the browser even if no voice data is received from the browser. The browser then receives the second voice data transmitted by the target device.

At S202, a first voice sampling parameter that can be utilized by a target device to process voice data is obtained.

The browser may, after receiving the second voice data, encapsulate the second voice data so as to reduce noise that would occur in the playing of the second voice data. Before encapsulation, a voice sampling parameter that can be utilized by the target device to process voice data has to be obtained. The first voice sampling parameter is a voice sampling parameter that can be utilized by the target device to process voice data.

It is noted that the first voice sampling parameter may be obtained from the target device each time the method for voice reception by a browser is performed. The first voice sampling parameter may also be obtained from the target device when the method for voice reception by a browser is performed for the first time and then locally stored, such that the first voice sampling parameter can be directly obtained locally when the method for voice reception by a browser is subsequently performed.

In one implementation, obtaining, when the method for voice reception by a browser is implemented every time or for the first time, the first voice sampling parameter from the target device may include: transmitting the first voice sampling parameter during a three-way handshake process of establishing a connection between the browser and the target device; or acquiring, actively or passively, the first voice sampling parameter from the target device when a communication channel between the browser and the target device is being established; or otherwise, acquiring, actively or passively, the first voice sampling parameter from the target device before the operation of S201 is performed. In other words, the sequence in which operations of S201 and S202 are performed is not limited in the embodiment.

It can be understood that a constant first voice sampling parameter of the target device may be acquired from the target device and stored locally for subsequent use. However, a first voice sampling parameter of the target device that typically varies may be acquired from the target device each time the method for voice reception by a browser is implemented.

At S203, the second voice data is encapsulated based on the first voice sampling parameter to obtain encapsulated voice data.

The browser encapsulates the received second voice data based on the first voice sampling parameter to obtain encapsulated second voice data. It should be emphasized that the format in which the second voice data is encapsulated includes, but is not limited to, WAV.

At S204, the encapsulated voice data as obtained is decoded through a built-in audio decoding interface of the browser.

The browser decodes, based on the first voice sampling parameter, the encapsulated voice data through a built-in audio decoding interface (e.g., decodeAudioData), so as to obtain decoded second voice data.

At S205, the decoded second voice data is played.

The decoded second voice data is played by the browser through a built-in audio playing interface. In this embodiment, the browser is able to receive the second voice data transmitted by the target device without using a plug-in. Therefore, functions of reception and playing are allowed in the intercom system comprising the browser and the target device.

In the embodiment of the present application, the target device may also actively transmit the second voice data to the browser even if no voice data is received from the browser. The browser encapsulates the received second voice data based on the first voice sampling parameter to obtain encapsulated voice data. The browser decodes the encapsulated voice data through a built-in audio decoding interface of the browser, and then plays the decoded second voice data through a built-in audio playing interface. As such, the browser is able to receive the second voice data transmitted from the target device without a plug-in. Therefore, functions of reception and playing are allowed in the intercom system comprising the browser and the target device.

Optionally, the first voice sampling parameter includes a first voice sampling accuracy and a first voice sampling frequency.

It can be understood that the first voice sampling parameters include, but are not limited to, the first voice sampling accuracy and the first voice sampling frequency. The first voice sampling frequency is related to a frequency at which the voice data is sampled, and the first voice sampling accuracy is related to accuracy of a sample of the voice data.

In one implementation of the present application, the second voice data is of pulse code modulated (PCM) format.

It can be understood that, in reply to PCM-formatted second voice data, the target device answers the browser with binary code-based response voice data of the lowest-level. A plug-in is not required for the browser or the terminal on which the browser runs to receive the response voice data.

In one implementation of the present application, before the operation of receiving second voice data transmitted by a target device, the method may further include:

establishing a communication channel to the target device through Websocket.

Receiving second voice data transmitted by a target device includes: receiving the second voice data transmitted by the target device through the communication channel.

It can be understood that, in this implementation, a communication connection between the browser and the target device is established through Websocket and a long connection between the browser and the target device is implemented, such that a normal communication between the browser and the target device is allowed. As such, the browser may send the target voice data to the target device through the communication channel to implement the transmission of voice.

The browser may send a Websocket communication request to the target device, and receive a Websocket communication request sent by the target device. After the establishment of a Websocket communication connection, a long connection between the browser and the target device may be implemented. A Websocket communication request has a small header, and thus occupies less bandwidth resources. Websocket is based on Websocket Protocol, a new protocol of HTML5, that can enable full-duplex communication between a browser and a target device. Through Websocket, a real-time transmission of voice data through a browser is ensured.

In one implementation of the present application, obtaining a first voice sampling parameter that can be utilized by a target device includes: receiving the first voice sampling parameter transmitted by the target device through the communication channel.

It can be understood that, in this implementation, after the establishment of a Websocket communication channel between the browser and the target device, the browser may receive the first voice sampling parameter transmitted by the target device through the communication channel, so as to acquire the first voice sampling parameter.

Figure 3:
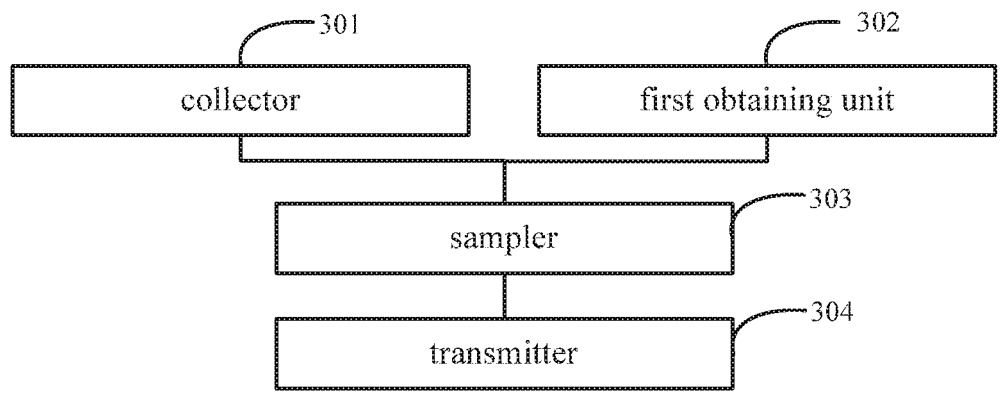
FIG. 3 is a structural block diagram of an apparatus for voice transmission by a browser according to an embodiment of the present application.

In correspondence with the above embodiment of the method for voice transmission by a browser, an embodiment of the present application provides an apparatus for voice transmission by a browser. The apparatus may include, as shown in FIG. 3, a collector 301, a first obtaining unit 302, a sampler 303 and a transmitter 304.

The collector 301 is configured to collect first voice data through a built-in audio collection interface of the browser.

The first obtaining unit 302 is configured to obtain a first voice sampling parameter that can be used by a target device to process voice data.

The sampler 303 is configured to sample the first voice data based on the first voice sampling parameter to obtain target voice data.

The transmitter 304 is configured to transmit the target voice data to the target device.

In embodiments of the present application, first voice data is collected through a built-in audio collection interface, instead of a plug-in, of a browser. Before transmission of voice data to a connected target device, the first voice data is sampled with a first voice data sampling parameter obtained from the target device. Target voice data is hereby obtained. The target device can play the target voice data as transmitted thereto. As such, the browser is able to collect and transmit voice data without using a plug-in.

In one implementation of the present application, the first voice sampling parameter obtained by the first obtaining unit includes a first voice sampling accuracy and a first voice sampling frequency.

In one implementation of the present application, the sampler may include: a calculating sub-unit and a sampling sub-unit.

The calculating sub-unit is configured to calculate a ratio between the first voice sampling frequency and a second voice sampling frequency; wherein, the second voice sampling frequency is a voice sampling parameter that can be utilized by the built-in audio collection interface of the browser to process voice data.

The sampling sub-unit is configured to sample the first voice data based on the ratio and the first voice sampling accuracy to obtain the target voice data.

In one implementation of the present application, the target voice data and the first voice data may be of a pulse code modulated (PCM) format.

In one implementation of the present application, the apparatus may further include a first communication connection unit.

The first communication connection unit is configured to, before transmitting the target voice data to the target device, establish a communication channel to the target device through Websocket.

The transmitter is configured to transmit the target voice data to the target device through the communication channel established by the first communication connection unit.

Optionally, the first obtaining unit is configured to receive, through the communication channel established by the first communication connection unit, the first voice sampling parameter transmitted by the target device.

Figure 4:
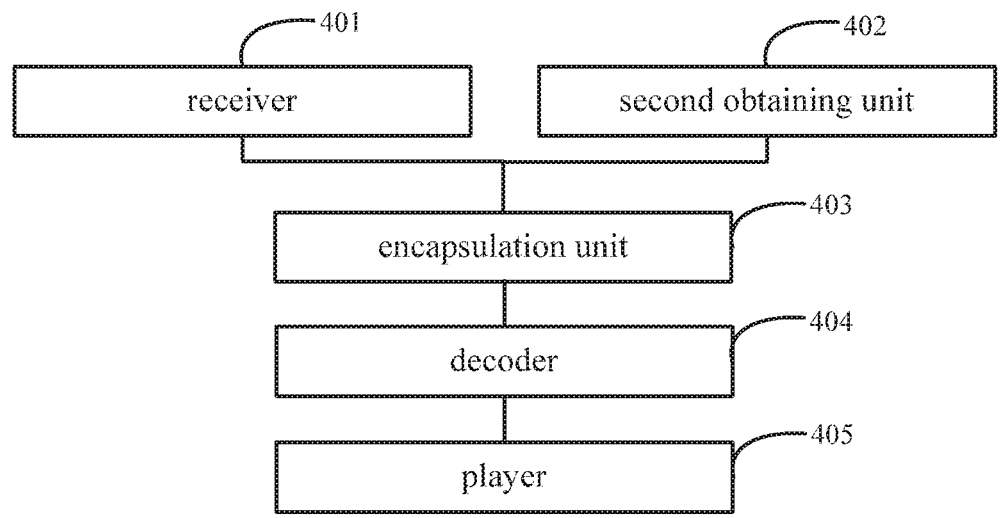
FIG. 4 is a structural block diagram of an apparatus for voice reception of a browser according to an embodiment of the present application.

In correspondence with the above embodiment of the method for voice reception by a browser. An embodiment of the present application provides an apparatus for voice reception by a browser, applicable to a browser. The apparatus may include, as shown in FIG. 4, a receiver 401, a second obtaining unit 402, an encapsulation unit 403, a decoder 404 and a player 405.

The receiver 401 is configured to receive second voice data transmitted by a target device;

The second obtaining unit 402 is configured to obtaining a first voice sampling parameter that can be utilized by a target device to process voice data.

The encapsulation unit 403 is configured to encapsulate the second voice data based on the first voice sampling parameter to obtain encapsulated voice data.

The decoder 404 is configured to decode, through a built-in audio decoding interface of the browser, the encapsulated voice data as obtained.

The player 405 is configured to play the decoded second voice data.

In the embodiment of the present application, in the case that the browser does not send the voice data to the target device, the target device actively sends the second voice data to the browser, and the browser encapsulates the received second voice data based on the acquired first voice sampling parameter to obtain the encapsulated voice data. The browser decodes the encapsulated voice data by using the browser's own audio decoding interface, and plays the decoded second voice data by using the browser's own audio playing interface, such that the browser can still receive the second voice data sent by the target device without using the plug-in, thereby implementing the intercom function between the browser and the target device.

Optionally, the first voice sampling parameter obtained by the second obtaining unit comprises a first voice sampling accuracy and a first voice sampling frequency.

In one implementation of the present application, the second voice data is of pulse code modulated (PCM) format.

Optionally, the apparatus may further include a second communication connection unit.

The second communication connection unit is configured to, before receiving second voice data transmitted by a target device, establish a communication channel to the target device through Websocket.

Accordingly, the receiver is configured to receive, through the communication channel established by the second communication connection unit, the second voice data transmitted by the target device.

Optionally, the second obtaining unit is configured to receive, through the communication channel established by the second communication connection unit, the first voice sampling parameter transmitted by the target device.

Figure 5:
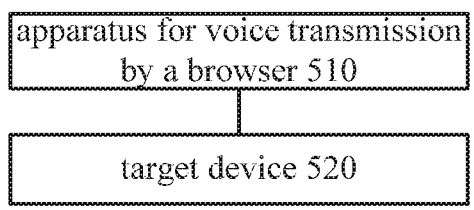
FIG. 5 is a structural block diagram of a voice intercom system according to an embodiment of the present application.

In correspondence with the above embodiments of the apparatus for voice transmission by a browser and the apparatus for voice reception by a browser, an embodiment of the present application provides a voice intercom system. As shown in FIG. 5, the system may include: an apparatus for voice transmission by a browser 510 and a target device 520.

The apparatus for voice transmission by a browser is configured to collect first voice data through a built-in audio collection interface of the browser; obtain a first voice sampling parameter that can be utilized by the target device 520 to process voice data; sample the first voice data based on the first voice sampling parameter to obtain target voice data; and transmit the target voice data to the target device.

The target device 520 is configured to receive the target voice data transmitted by the apparatus for voice transmission by a browser 510.

Figure 6:
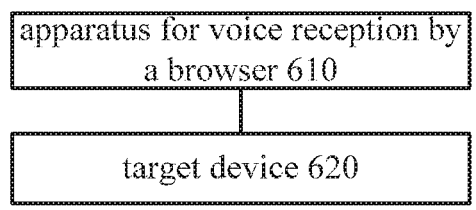
FIG. 6 is a structural block diagram of another voice intercom system according to an embodiment of the present application.
Figure 7:
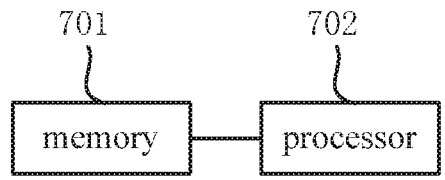
FIG. 7 is a schematic structural diagram of an electronic device according to an embodiment of the present application.

In correspondence with the above embodiments of the apparatus for voice transmission by a browser and the apparatus for voice reception by a browser, an embodiment of the present application provides another voice intercom system. As shown in FIG. 6, the system may include an apparatus 610 for voice reception of a browser and a target device 620.

The target device 620 is configured to transmit second voice data to the apparatus for voice reception by a browser.

The apparatus for voice reception by a browser 610 is configured to receive second voice data transmitted by a target device; obtain a first voice sampling parameter that can be utilized by a target device to process voice data; encapsulate the second voice data based on the first voice sampling parameter to obtain encapsulated voice data; decode, through a built-in audio decoding interface of the browser, the encapsulated voice data as obtained; and play the decoded second voice data.

In correspondence with the above embodiments of the methods, an embodiment of the present application further provides a storage medium. The storage medium is configured to store executable program codes, which performs, when being executed, the method for voice transmission by a browser or the method for voice reception by a browser described in the embodiments of the present application. Wherein, the method for voice transmission a browser may include the following operations:

collecting first voice data through a built-in audio collection interface of the browser;

obtaining a first voice sampling parameter that can be utilized by a target device to process voice data;

sampling the first voice data based on the first voice sampling parameter to obtain target voice data; and transmitting the target voice data to the target device.

Optionally, the first voice sampling parameter comprises a first voice sampling accuracy and a first voice sampling frequency.

Optionally, sampling the first voice data based on the first voice sampling parameter to obtain target voice data comprises:

calculating a ratio between the first voice sampling frequency and a second voice sampling frequency; wherein, the second voice sampling frequency is a voice sampling parameter that can be utilized by the built-in audio collection interface of the browser to process voice data; and sampling the first voice data based on the ratio and the first voice sampling accuracy to obtain the target voice data.

Optionally, before transmitting the target voice data to the target device, the method further comprises:

establishing a communication channel to the target device through Websocket;

transmitting the target voice data to the target device comprises: transmitting the target voice data to the target device through the communication channel.

Optionally, obtaining a first voice sampling parameter that can be utilized by a target device to process voice data comprises: receiving, through the communication channel, the first voice sampling parameter transmitted by the target device.

The method for voice reception by a browser may include the following operations:

receiving second voice data transmitted by a target device;

obtaining a first voice sampling parameter that can be utilized by a target device to process voice data;

encapsulating the second voice data based on the first voice sampling parameter to obtain encapsulated voice data;

decoding, through a built-in audio decoding interface of the browser, the encapsulated voice data as obtained; and playing the decoded second voice data.

Optionally, the first voice sampling parameter comprises a first voice sampling accuracy and a first voice sampling frequency.

Optionally, before receiving second voice data transmitted by a target device, the method further comprises:

establishing a communication channel to the target device through Websocket; and receiving second voice data transmitted by a target device comprises: receiving, through the communication channel, the second voice data transmitted by the target device.

Optionally, obtaining a first voice sampling parameter that can be utilized by a target device to process voice data comprises: receiving, through the communication channel, the first voice sampling parameter transmitted by the target device.

In correspondence with the method embodiments as described above, an embodiment of the present application further provides an application program, which performs, when being executed, the method for voice transmission by a browser or the method for voice reception by a browser as described in embodiments of the present application. The method for voice transmission by a browser may include the following operations:

collecting first voice data through a built-in audio collection interface of the browser;

obtaining a first voice sampling parameter that can be utilized by a target device to process voice data;

sampling the first voice data based on the first voice sampling parameter to obtain target voice data; and transmitting the target voice data to the target device.

Optionally, the first voice sampling parameter comprises a first voice sampling accuracy and a first voice sampling frequency.

Optionally, sampling the first voice data based on the first voice sampling parameter to obtain target voice data comprises:

calculating a ratio between the first voice sampling frequency and a second voice sampling frequency; wherein, the second voice sampling frequency is a voice sampling parameter that can be utilized by the built-in audio collection interface of the browser to process voice data; and sampling the first voice data based on the ratio and the first voice sampling accuracy to obtain the target voice data.

Optionally, before transmitting the target voice data to the target device, the method further comprises:

establishing a communication channel to the target device through Websocket;

transmitting the target voice data to the target device comprises: transmitting the target voice data to the target device through the communication channel.

Optionally, obtaining a first voice sampling parameter that can be utilized by a target device to process voice data comprises: receiving, through the communication channel, the first voice sampling parameter transmitted by the target device.

The method for voice reception of a browser may include the following operations:

receiving second voice data transmitted by a target device;

obtaining a first voice sampling parameter that can be utilized by a target device to process voice data;

encapsulating the second voice data based on the first voice sampling parameter to obtain encapsulated voice data;

decoding, through a built-in audio decoding interface of the browser, the encapsulated voice data as obtained; and playing the decoded second voice data.

Optionally, the first voice sampling parameter comprises a first voice sampling accuracy and a first voice sampling frequency.

Optionally, before receiving second voice data transmitted by a target device, the method further comprises:

establishing a communication channel to the target device through Websocket; and receiving second voice data transmitted by a target device comprises:

receiving, through the communication channel, the second voice data transmitted by the target device.

Optionally, obtaining a first voice sampling parameter that can be utilized by a target device to process voice data comprises: receiving, through the communication channel, the first voice sampling parameter transmitted by the target device.

In correspondence with the method embodiments as described above, an embodiment of the present application further provides an electronic device. The electronic device includes: a memory 701 and a processor 702.

The memory 701 is configured to store a computer program.

The processor 702 is configured to execute the program stored in the memory 701, so as to perform the method for voice transmission by a browser or the method for voice reception by browser as described in embodiments of the present application. The method for voice transmission by a browser may include the following operations:

collecting first voice data through a built-in audio collection interface of the browser;

obtaining a first voice sampling parameter that can be utilized by a target device to process voice data;

sampling the first voice data based on the first voice sampling parameter to obtain target voice data; and transmitting the target voice data to the target device.

Optionally, the first voice sampling parameter comprises a first voice sampling accuracy and a first voice sampling frequency.

Optionally, sampling the first voice data based on the first voice sampling parameter to obtain target voice data comprises:

calculating a ratio between the first voice sampling frequency and a second voice sampling frequency; wherein, the second voice sampling frequency is a voice sampling parameter that can be utilized by the built-in audio collection interface of the browser to process voice data; and sampling the first voice data based on the ratio and the first voice sampling accuracy to obtain the target voice data.

Optionally, before transmitting the target voice data to the target device, the method further comprises:

establishing a communication channel to the target device through Websocket;

transmitting the target voice data to the target device comprises: transmitting the target voice data to the target device through the communication channel.

Optionally, obtaining a first voice sampling parameter that can be utilized by a target device to process voice data comprises: receiving, through the communication channel, the first voice sampling parameter transmitted by the target device.

The method for voice reception by a browser may include the following operations:

receiving second voice data transmitted by a target device;

obtaining a first voice sampling parameter that can be utilized by a target device to process voice data;

encapsulating the second voice data based on the first voice sampling parameter to obtain encapsulated voice data;

decoding, through a built-in audio decoding interface of the browser, the encapsulated voice data as obtained; and playing the decoded second voice data.

Optionally, the first voice sampling parameter comprises a first voice sampling accuracy and a first voice sampling frequency.

Optionally, before receiving second voice data transmitted by a target device, the method further comprises:

establishing a communication channel to the target device through Websocket; and receiving second voice data transmitted by a target device comprises: receiving, through the communication channel, the second voice data transmitted by the target device.

Optionally, obtaining a first voice sampling parameter that can be utilized by a target device to process voice data comprises: receiving, through the communication channel, the first voice sampling parameter transmitted by the target device.

The memory 701 may be a random access memory (abbreviated as RAM), or a non-volatile memory (NVM), such as at least one disk memory. Optionally, the memory 701 may also be at least one storage device remote from the above processor 702.

The above processor 702 may be a general-purpose processor, such as a central processing unit (abbreviated as CPU), a network processor (abbreviated as NP), or the like; a digital signal processor (abbreviated as DSP); an application specific integrated circuit (abbreviated as ASIC); a field-programmable gate array (abbreviated as FPGA) or other programmable logic equipment; discrete gates or transistor logic devices, discrete hardware components.

It is noted that, a brief description is provided to embodiments of the storage medium, the application program and the electronic device in view of their resemblance with previous method embodiments. For relevant details, reference can be made to the method embodiments.

It should be noted that the relationship terms used here, such as "first", "second", and the like are only used to distinguish one entity or operation from another entity or operation, but do not necessarily require or imply that there is actual relationship or order between these entities or operations. Moreover, the terms "include", "comprise", or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "include(s) a/an . . . ", "comprise(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the apparatus is described briefly, since it is substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for voice transmission by a browser, comprising:
    collecting first voice data through a built-in audio collection interface of the browser;
    obtaining a first voice sampling parameter that can be utilized by a target device to process voice data;
    sampling the first voice data based on the first voice sampling parameter to obtain target voice data; and
    transmitting the target voice data to the target device;
    wherein, the first voice sampling parameter comprises a first voice sampling accuracy and a first voice sampling frequency; and sampling the first voice data based on the first voice sampling parameter to obtain target voice data comprises:
    calculating a ratio between the first voice sampling frequency and a second voice sampling frequency; wherein, the second voice sampling frequency is a voice sampling parameter that can be utilized by the built-in audio collection interface of the browser to process voice data; and
    sampling the first voice data based on the ratio and the first voice sampling accuracy to obtain the target voice data.

2. The method of claim 1, wherein, before transmitting the target voice data to the target device, the method further comprises:
    establishing a communication channel to the target device through Websocket;
    transmitting the target voice data to the target device comprises: transmitting the target voice data to the target device through the communication channel.

3. The method of claim 2, wherein, obtaining a first voice sampling parameter that can be utilized by a target device to process voice data comprises: receiving, through the communication channel, the first voice sampling parameter transmitted by the target device.

4. A method for voice reception by a browser, comprising:
    receiving second voice data transmitted by a target device;
    obtaining a first voice sampling parameter that can be utilized by a target device to process voice data;
    encapsulating the second voice data based on the first voice sampling parameter to obtain encapsulated voice data;
    decoding, through a built-in audio decoding interface of the browser, the encapsulated voice data as obtained; and
    playing the decoded second voice data;
    wherein, the first voice sampling parameter comprises a first voice sampling accuracy and a first voice sampling frequency;
    encapsulating the second voice data based on the first voice sampling parameter to obtain encapsulated voice data comprises:
    calculating a ratio between the first voice sampling frequency and a second voice sampling frequency; wherein, the second voice sampling frequency is a voice sampling parameter that can be utilized by the built-in audio collection interface of the browser to process voice data; and
    encapsulating the second voice data based on the ratio and the first voice sampling accuracy to obtain the target voice data.

5. The method of claim 4, wherein, before receiving second voice data transmitted by a target device, the method further comprises:
    establishing a communication channel to the target device through Websocket;
    receiving second voice data transmitted by a target device comprises: receiving, through the communication channel, the second voice data transmitted by the target device.

6. The method of claim 5, wherein, obtaining a first voice sampling parameter that can be utilized by a target device to process voice data comprises: receiving, through the communication channel, the first voice sampling parameter transmitted by the target device.

7. A voice intercom system, comprising: an apparatus for voice transmission by a browser configured to perform the method for voice transmission by a browser according to claim 1; and a target device
configured to receive the target voice data transmitted by the apparatus for voice transmission by a browser.

8. A voice intercom system, comprising: an apparatus for voice reception by a browser configured to perform the method for voice reception by a browser according to claim 4;
and a target device configured to transmit second voice data to the apparatus for voice reception by a browser.

9. A non-transitory storage medium for storing an executable program code which, when being executed, performs the method for voice transmission by a browser according to claim 1.

10. An electronic device, comprising: a memory and a processor;
the memory is configured to store a computer program;
the processor is configured to execute the program stored in the memory, so as to perform the method for voice transmission by a browser according to claim 1.

11. A non-transitory storage medium for storing an executable program code which, when being executed, performs the method for voice reception by a browser according to claim 4.

12. An electronic device, comprising: a memory and a processor;
the memory is configured to store a computer program;
the processor is configured to execute the program stored in the memory, so as to perform the method for voice reception by a browser according to claim 4.

* * * * *